(12) United States Patent
Nakajima

(10) Patent No.: US 6,751,172 B2
(45) Date of Patent: Jun. 15, 2004

(54) WOBBLE DETECTING APPARATUS

(75) Inventor: Eiji Nakajima, Saitama (JP)

(73) Assignee: Pioneer Corporation, Tokyo (JP)

(*) Notice: Subject to any disclaimer, the term of this patent is extended or adjusted under 35 U.S.C. 154(b) by 345 days.

(21) Appl. No.: 09/933,829

(22) Filed: Aug. 22, 2001

(65) Prior Publication Data
US 2002/0024897 A1 Feb. 28, 2002

(30) Foreign Application Priority Data
Aug. 23, 2000 (JP) .......................... 2000-252324

(51) Int. Cl.[7] ................................. G11B 7/00
(52) U.S. Cl. ..................... 369/44.13; 369/44.29; 369/44.36
(58) Field of Search ................... 369/44.13, 44.26, 369/44.27, 44.35, 44.29

(56) References Cited
U.S. PATENT DOCUMENTS
6,175,540 B1 * 1/2001 Kim ...................... 369/44.13
* cited by examiner Primary Examiner—Doris H. To
Assistant Examiner—Jorge L Ortiz-Criado
(74) Attorney, Agent, or Firm—Sughrue Mion, PLLC

(57) ABSTRACT

A wobble detecting apparatus for an information recording and/or reproducing for an optical disk, includes a wobble detecting unit for detecting a wobble on the basis of a signal from a light receiving element which receives light reflected from the optical disk; an offset voltage generating unit for generating an offset voltage; an adder unit for adding said offset voltage to a control signal to an actuator for the optical disk; an actuator switch for on/off controlling a control signal to said actuator; and a control unit for turning on said actuator for wobble detection to decide whether or not the wobble has been detected by said wobble detecting unit, and if the wobble has not been detected, causing said offset voltage generating unit to generate a positive or negative prescribed voltage to decide further whether or not the wobble has been detected by said wobble detecting unit. In this configuration, the wobble can be detected with high accuracy.

5 Claims, 9 Drawing Sheets

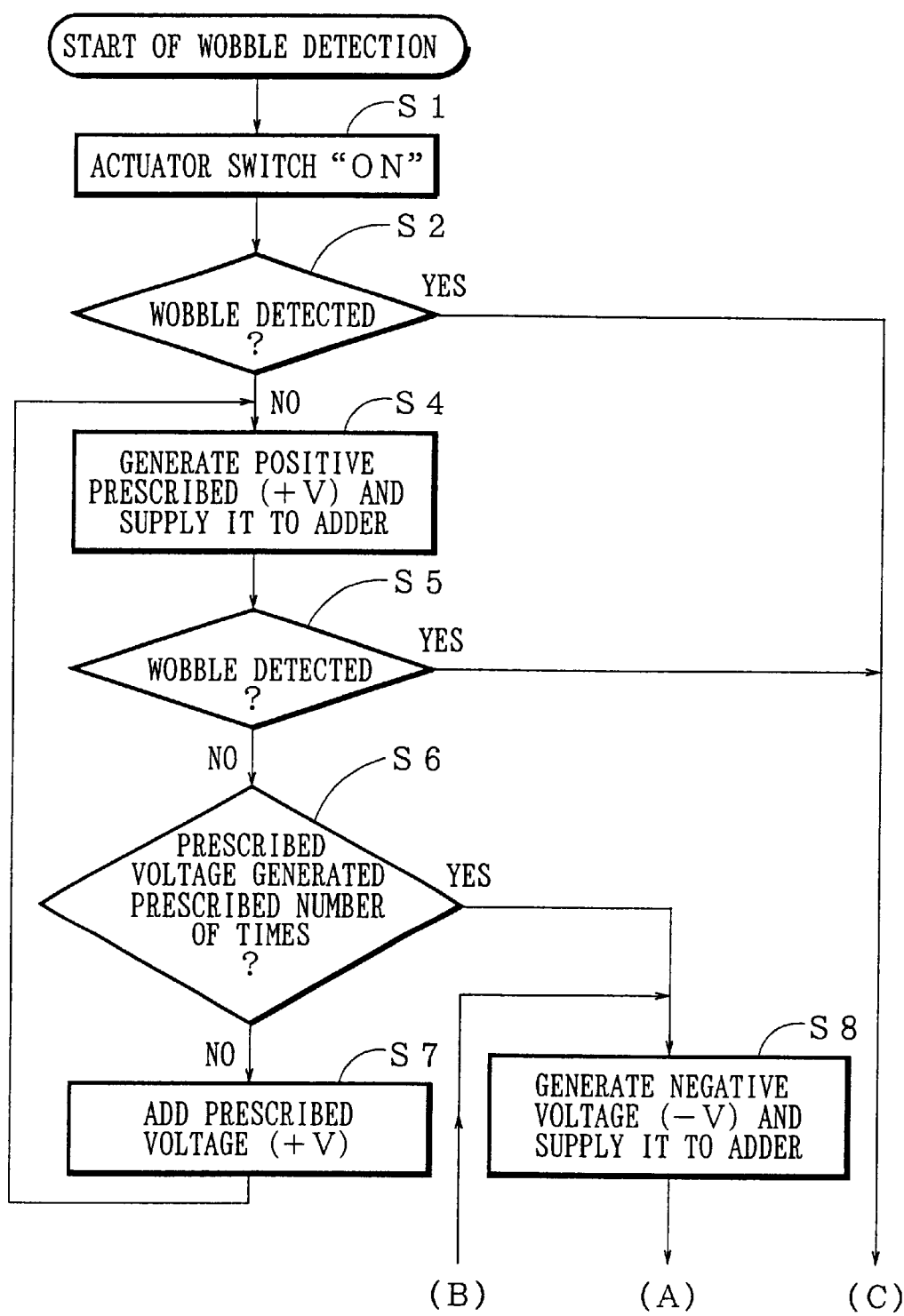

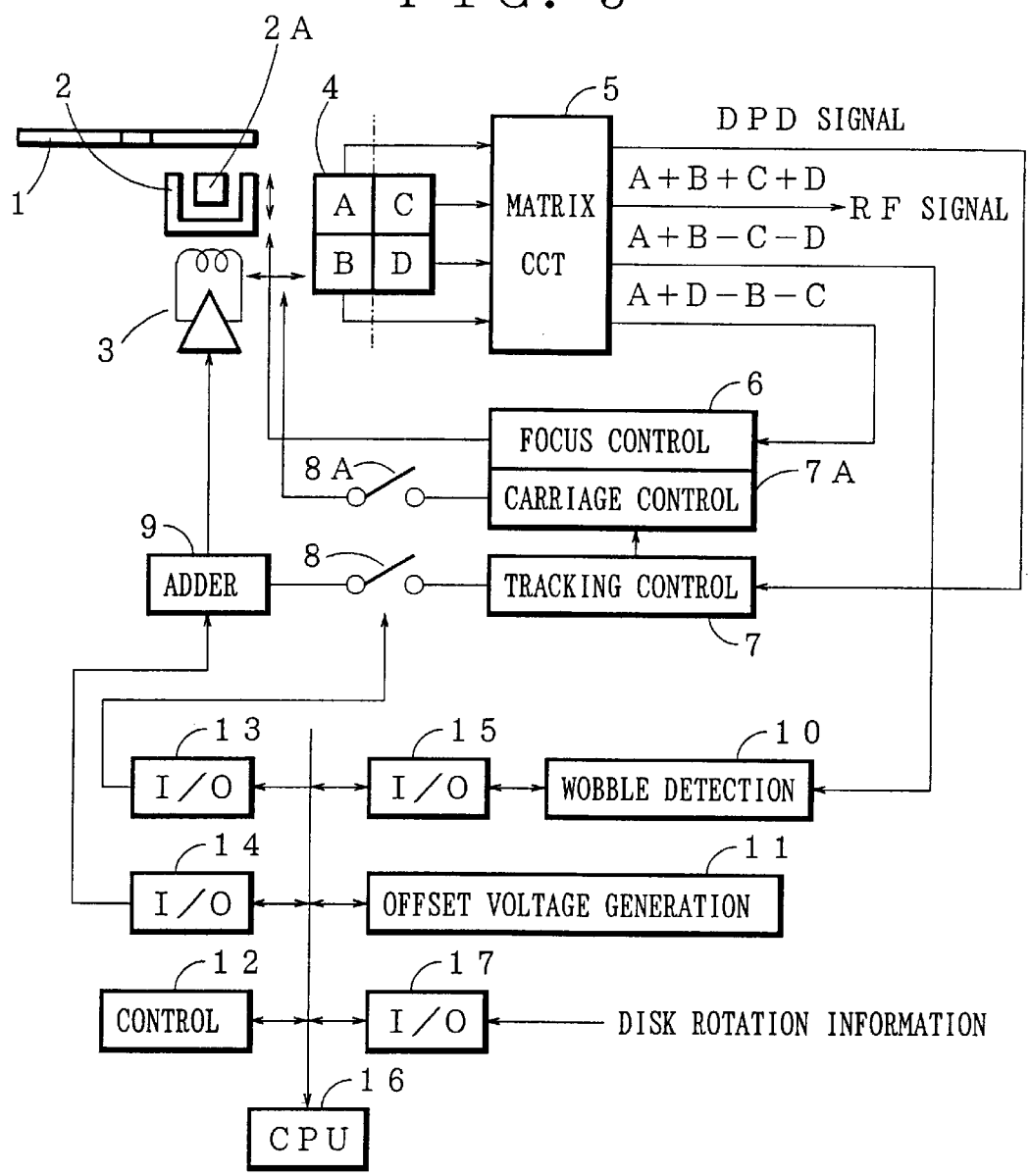

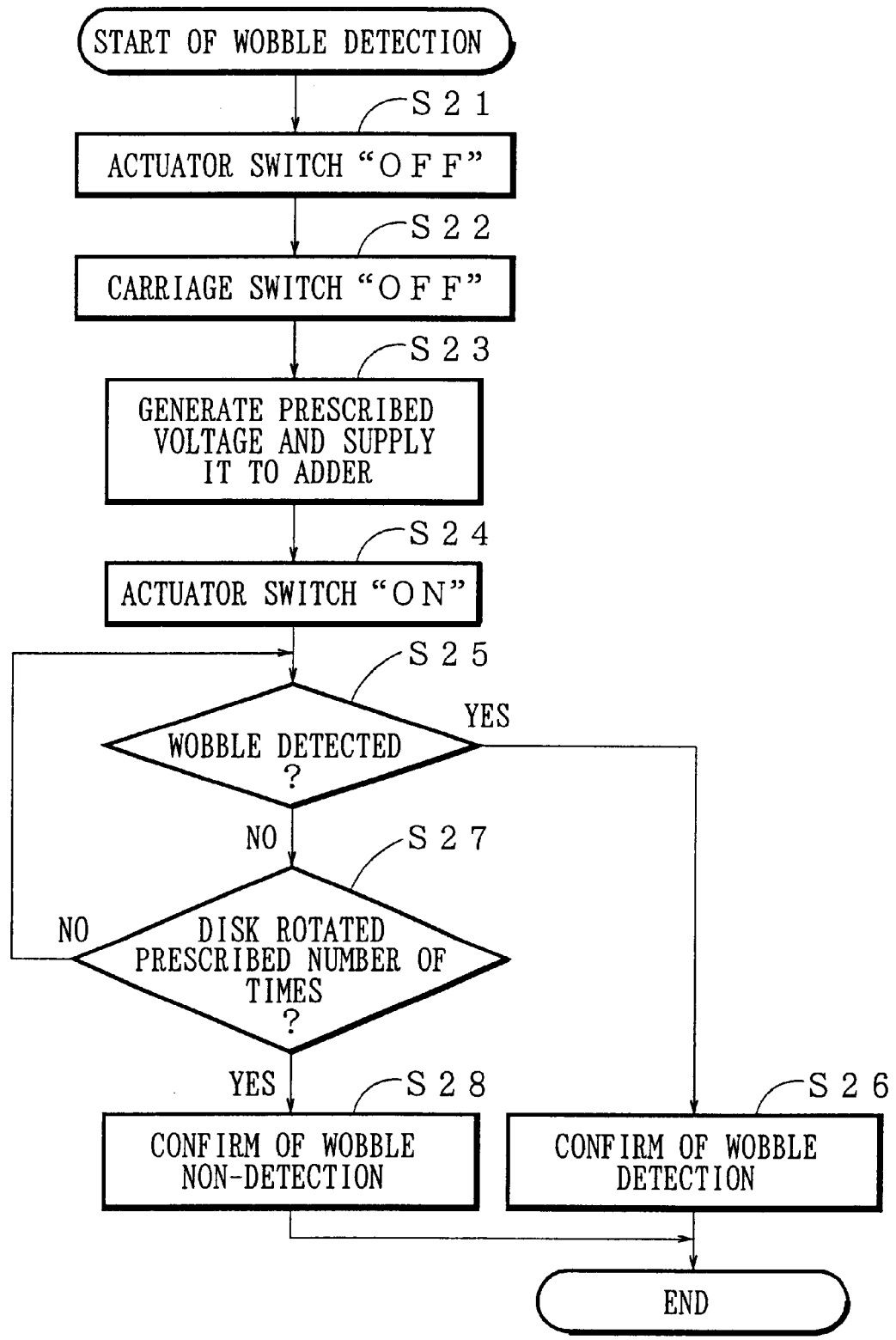

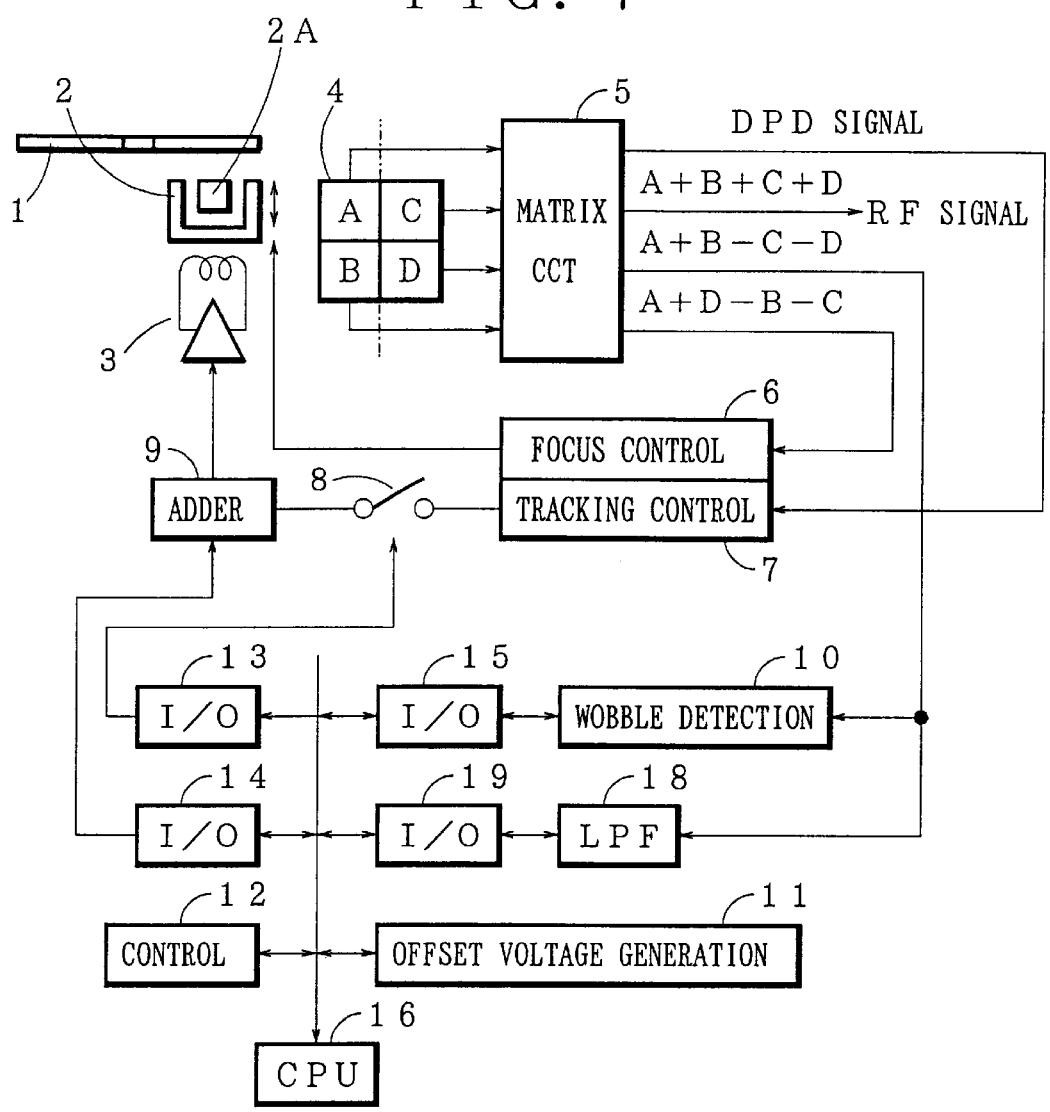

PRIOR ART

WOBBLE DETECTING APPARATUS

BACKGROUND OF THE INVENTION

1. Field of the Invention

This invention relates to a wobble detecting apparatus for detecting a wobble signal of an optical disk in a device for recording and/or reproducing information for the optical disk.

2. Description of the Related Art

In an optical disk such as a writable CD or DVD, as shown in FIG. 10, a track 1A of an optical disk 1 on which information is to be stored wobbles. The wobble is detected to reproduce a clock signal at the time of the write.

In the device for recording and/or reproducing information for the optical disk, as the case may be, the presence or absence of the wobble is decided to determine whether the optical disk loaded in the device is recordable or dedicated to only reproduction.

In the device for recording and/or reproducing information for an optical disk, laser light is focused, the focused light is projected on the optical disk, and the light reflected from the optical disk is received by a light receiving element, thereby providing a wobble signal, a tracking signal, a focus signal and a reproduction signal.

FIG. 11 shows relative positions of a light receiving element and a received light spot 21 of the reflected light projected on the light receiving element 4.

The light receiving element 4 is partitioned into four sections A, B, C and D. In shipping the device, as seen from FIG. 11B, adjustment is made so that the received light spot is projected on the center of the four divided sections. This adjustment cannot be made completely. As seen from FIG. 11A, the optical axis is misaligned leftward, or otherwise, as seen from FIG. 11C, the optical axis is misaligned rightward.

The wobble signal is obtained from a difference signal (A+B)–(C+D) on the basis of the output signals from the sections A, B, C and D of the light receiving element 4.

As seen from FIGS. 11A and 11C, when the received light spot deviates from the boundary between the sections A, B and C, D owing to the misalignment of the optical axis, the S/N ratio of the wobble signal based on the difference signal (A+B)–(C+D) is deteriorated, and hence the presence or absence of the wobble signal cannot be detected precisely.

SUMMARY OF THE INVENTION

An object of this invention is to provide a wobble signal detecting apparatus which can detect the presence or absence of a wobble.

In order to attain the above object, in accordance with an aspect of this invention, there is provided a wobble detecting apparatus for a device for recording and/or reproducing information for an optical disk, comprising:

a wobble detecting unit for detecting a wobble on the basis of a signal from a light receiving element which receives light reflected from the optical disk;

an offset voltage generating unit for generating an offset voltage;

an adder unit for adding the offset voltage to a control signal to an actuator for the optical disk;

an actuator switch for on/off controlling a control signal to the actuator; and a control unit for turning on the actuator for wobble detection to decide whether or not the wobble has been detected by the wobble detecting unit, and if the wobble has not been detected, causing the offset voltage generating unit to generate a positive or negative prescribed voltage to decide further whether or not the wobble has been detected by the wobble detecting unit.

In a preferred embodiment, where the wobble has not been detected by the wobble detecting unit when the positive or negative prescribed voltage is generated by the offset voltage generating unit, the control unit causes the offset voltage generating unit to generate a new offset voltage of the prescribed voltage plus the offset voltage previously produced, thereby causing the wobble detecting unit to repeat the wobble detection by a prescribed number of times.

In accordance with another aspect of this invention, there is provided a wobble detecting apparatus for a device for recording and/or reproducing information for an optical disk, comprising:

a wobble detecting unit for detecting a wobble on the basis of a signal from a light receiving element which receives light reflected from the optical disk;

an offset voltage generating unit for generating an offset voltage;

an adder unit for adding the offset voltage to a control signal to an actuator for the optical disk;

an actuator switch for on/off controlling a control signal to the actuator;

an carriage switch for on/off controlling a control signal to a carriage on which the actuator is loaded; and a control unit for turning on the carriage switch turning on the actuator for wobble detection and causing the offset voltage generating unit to generate a prescribed voltage to decide whether or not the wobble has been detected by the wobble detecting unit.

In a preferred embodiment of another aspect of this invention, the control unit counts the number of rotation of the optical disk from when wobble detection is started, and confirms non-detection of the wobble if the wobble has not detected when the counted value reaches a prescribed number of times.

In accordance with still another aspect of this invention, there is provided a wobble detecting apparatus for a device for recording and/or reproducing information for an optical disk, comprising:

a wobble detecting unit for detecting a wobble on the basis of a signal from a light receiving element which receives light reflected from the optical disk;

a low pass filter for passing a DC component of a difference signal produced from the light emitting element;

an offset voltage generating unit for generating an offset voltage;

an adder unit for adding the offset voltage to a control signal to an actuator for the optical disk;

an actuator switch for on/off controlling a control signal to the actuator; and a control unit for turning off the actuator for wobble detection, causing the offset voltage generating unit to generate the offset voltage so that an output form the low pass filter is zero, turning on the actuator switch when the output from the low pass filter has become approximately zero, and deciding whether or not the wobble has been detected by the wobble detecting unit.

In accordance with this invention, an actuator is moved to realize the state with no misalignment of an optical axis, and in this state, a wobble is detected. Therefore, S/N can be improved and the presence or absence of the wobble can be detected accurately.

The above and other objects and features of the invention will be more apparent from the following description taken in conjunction with the accompanying drawings.

BRIEF DESCRIPTION OF THE DRAWINGS

FIGS. 3 and 4 are flowcharts for explaining the operation of the first embodiment of this invention;

FIG. 5 is an arrangement view of the second embodiment of this invention;

FIG. 6 is a flowchart of the operation of the second embodiment of this invention; and FIG. 7 is an arrangement view of the third embodiment of this invention;

DESCRIPTION OF THE PREFERRED EMBODIMENTS

Figure 1:
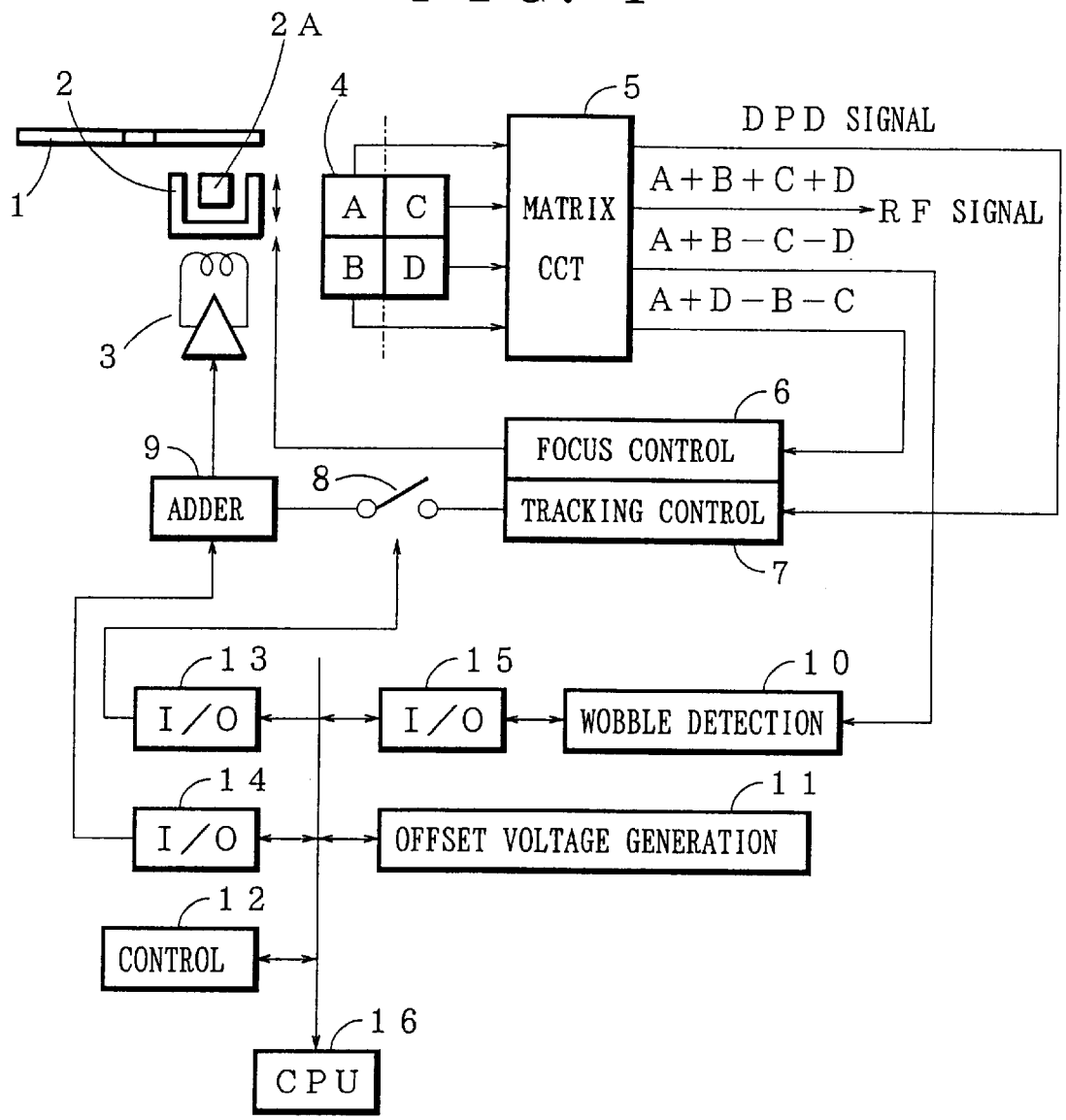
FIG. 1 is an arrangement view of a first embodiment of this invention.

Referring to the drawings, an explanation will be given of various embodiments of this invention.

Embodiment 1

Figure 4:
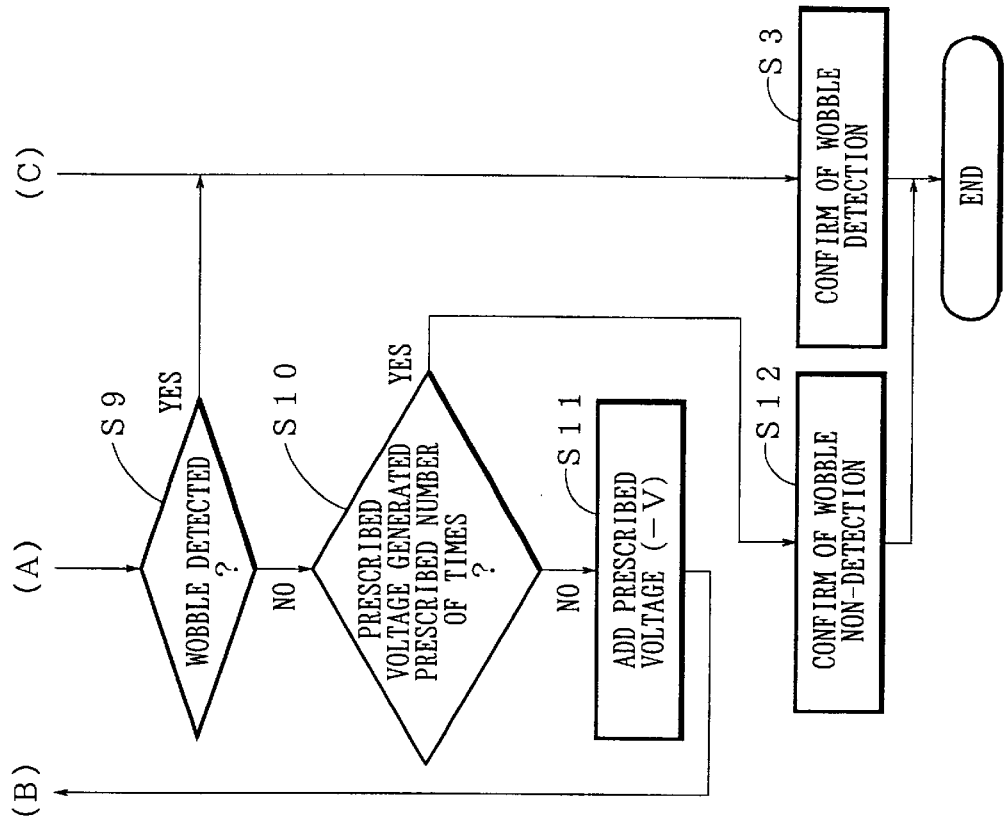
Figure 2:
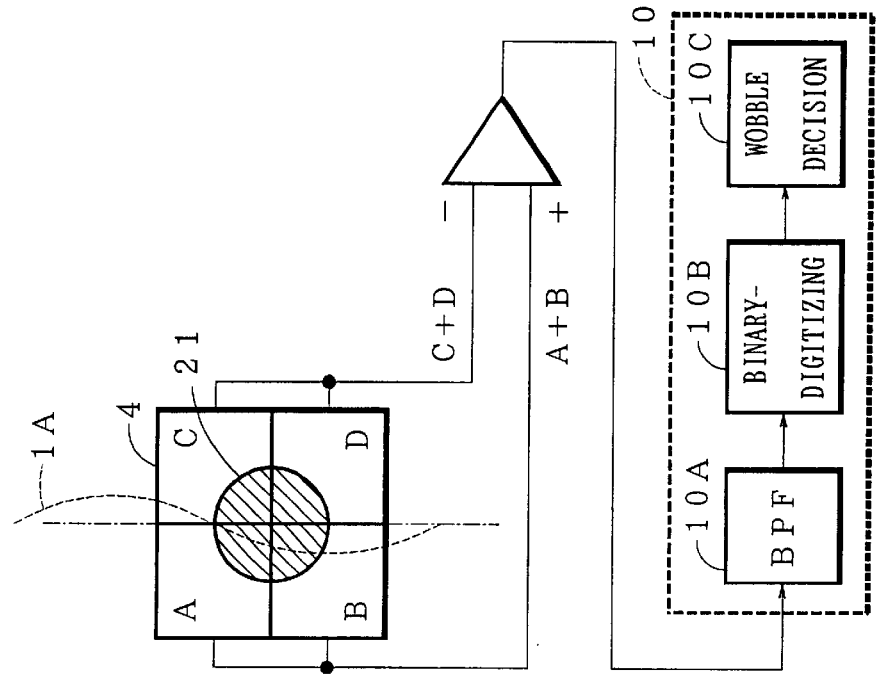
FIG. 2 is a block diagram showing an example of a wobble detecting unit.

FIG. 1 is an arrangement view of a first embodiment of this invention; FIG. 2 is a block diagram showing an example of a wobble detecting unit; and FIGS. 3 and 4 are flowcharts for explaining the operation of the first embodiment of this invention.

Referring to FIG. 1, reference numeral 1 denotes an optical disk; 2 a carriage; 2A an actuator on which an objective lens for focusing laser light on the optical disk 1 is loaded; 3 a driver for driving the actuator; 4 a light receiving element; 5 a matrix circuit; 6 a focus control unit; 7 a tracking control unit; 8 an actuator switch; and 9 an adder unit.

In the apparatus for recording and reproducing information on and from the optical disk 1, the matrix circuit 5 produces an RF signal of A+B+C+D based on the output signals from the four divided sections A, B, C and D of the light receiving element 4, and also creates e.g. (phase difference between the RF signal and the output signal A)+(phase difference between the RF signal and the output signal D)−(phase difference between the RF signal and the output signal B)−(phase difference between the RF signal and the output signal C) which is to be supplied to the tracking control unit 7. Namely, tracking is executed by the DPD (Differential Phase Detection) technique. The recording and/or reproducing apparatus creates the signal (A+D−B−C) to be supplied to the focus control unit 6, thereby executing the focus control.

The actuator 2A is moved according to a control voltage applied to the driver 3. For example, if the control voltage is positive, the actuator 2A moves by a prescribed distance toward the inner periphery of the optical disk 1, whereas if the control voltage is negative, the actuator 2A moves by the prescribed distance toward the outer periphery of the optical disk 1.

The actuator 2A is loaded on the carriage 2 by e.g. spring. During the tracking, the actuator 2A follows a track to move. When the actuator 2A moves by a prescribed distance, the carriage 2 moves toward the outer periphery and then the actuator 2A is located on the center of the carriage 2.

The above operation is the same as that of the conventional device for recording and reproducing information on and from the optical disk.

Incidentally, in FIG. 1, reference numeral 10 denotes a wobble detecting unit; 11 an offset voltage generating unit; 12 a control unit; 13–15 an interface (I/O); and 16 a processor (CPU).

As seen from FIG. 2, in the wobble detecting unit 10, a difference signal (A+B)−(C+D) from the light receiving element 4 is converted into a square wave by a binary-digitizing circuit 10B through a band-pass filter (BPF) 10A passing a wobble signal frequency.

A wobble deciding circuit 10C decides that if a subsequent pulse is successively produced within a prescribed time after a certain pulse is produced from the binary-digitizing circuit 10B, there is a wobble, and if the subsequent pulse is not successively produced, there is no wobble.

Now referring to FIG. 3, an explanation will be given of the processing operation of the first embodiment.

When the wobble detecting operation is started, step S1 is first executed.

In step S1, the control unit 12 turns on the actuator switch 8 to start the tracking operation.

In step S2, the control unit 12 determines whether or not a wobble has been detected by the wobble detecting unit 10. If YES, the processing proceeds to step S3. In step S3, the control unit 12 produces an output indicative of that the wobble has been detected. The processing is ended.

If NO in step S2, the processing proceeds to step S4. In step S4, the control unit 12 instructs the offset voltage generating unit 11 to generate a positive prescribed offset voltage (+V).

The prescribed offset voltage (V) is set at a voltage which causes the actuator 2A to move by e.g. about 10 µm.

The positive offset voltage thus generated is supplied to the adder unit 9 through the I/O 14. It is added to the tracking control voltage produced from the tracking control unit 7. The resultant voltage is entered into the driver 3.

When the positive offset voltage (+V) is entered into the driver 3, the driver 3 causes the actuator 2A to move toward e.g. the inner periphery of the optical disk 1.

Owing to the movement of the actuator 2A, misalignment of the optical axis will occur.

Figure 11A:
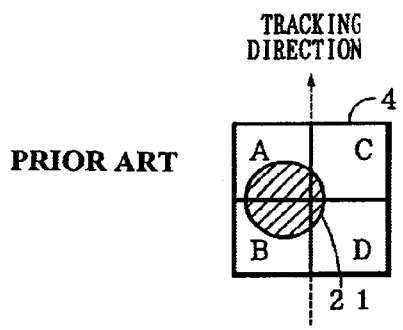
FIGS. 11A–11C are views for explaining the misalignment of an optical axis.
Figure 11B:
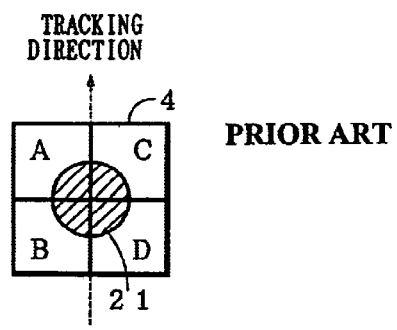

Now assuming that the state where the offset voltage is not superimposed on the tracking control voltage is that shown in FIG. 11A, when the actuator 2A is moved toward the inner periphery of the optical disk, the state approaches the state shown in FIG. 11B where the wobble is detected.

Figure 11C:
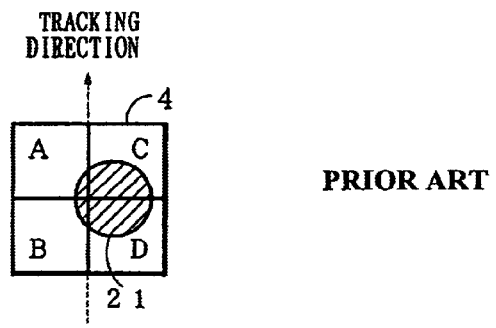

Assuming that the state where the offset voltage is not superimposed on the tracking control voltage is that shown in FIG. 11C, superimposing of the offset voltage further increases the misalignment of the optical axis so that the light received spot 21 moves further rightwards, which results in the state where no wobble is detected.

In step S5, the control unit 12 determines whether or not the wobble has been detected by the wobble detecting unit 10. If YES, the processing proceeds to step S3. In step S3, the control unit 12 confirms that the wobble has been detected. The processing is ended.

If NO in step S5, the processing proceeds to step S6. In step S6, the control unit 12 determines whether or not the prescribed voltage has been generated by a prescribed number of times. If NO in step S6, the processing proceeds to step S7.

In step S7, the control unit 12 instructs the offset voltage generating unit 11 to generate a voltage resulting from addition of the prescribed voltage (+V) to the offset voltage (+V) which is being generated, thus generating an offset voltage of +nV (n: number of generation times). In this way, steps S4-step S7 are repeated.

Incidentally, assuming that the maximum value of the misalignment of the optical axis in shipping the information recording and/or reproducing device is ±80 μm, the prescribed number of times N is set at 8. If the wobble is not detected even when the offset voltage +V is generated to move the actuator 2A by +10 μm, +2V (n=2) is generated to move the actuator 2A by +20 μm to detect whether or not the wobble has been detected.

Even with n=8, if no wobble is detected, under the decision the state will not approach the state shown in FIG. 11B even if the alignment of the optical disk is generated in the +direction, the processing proceeds to step S8. Steps S8 to S11 are executed.

In step S8, the control unit 12 instructs the offset voltage generating unit 11 to generate a negative prescribed offset voltage (−V). The same processing S8–S11 as steps S4 to S7 is repeated.

If it is determined in step S10 that the prescribed negative voltage has been generated by the prescribed number of times, the processing proceeds to step S12. In step S12, the control unit 12 produces an output indicative of that no wobble has been detected. The processing is ended.

Embodiment 2

Referring to FIGS. 5 and 6, an explanation will be given of the second embodiment of this invention. FIG. 5 is an arrangement view of the second embodiment of this invention, and FIG. 6 is a flowchart of the operation of the second embodiment of this invention.

In the arrangement according to the second embodiment, as seen from FIG. 5, a carriage control unit 7A, a carriage switch 8A and an I/O 17 are added to the arrangement of the first embodiment explained referring to FIG. 1.

Referring to FIG. 6, an explanation will be given of the operation of the second embodiment.

In step S21, the control unit 12 turns OFF the actuator switch 8 and in step S22, the control unit 12 turns OFF the carriage switch 8A.

In step S23, the control unit 12 instructs the offset voltage generating unit 111 to generate an offset voltage (+Vo) The positive offset voltage thus generated is supplied to the adder unit 9 through the I/O 14.

When the offset voltage (+Vo) is entered into the adder unit 9, the actuator 2A moves by e.g. 80 μm toward the inner periphery of the optical disk 1.

In step S24, the control unit 12 turns ON the actuator switch 8. When the actuator switch 8 is turned ON and the carriage switch 8A is turned OFF, the actuator 2A moves from the inner periphery to the outer periphery as the optical disk 1 rotates, thus generating the misalignment of the optical axis.

In step S25, the control unit 12 determines whether or not a wobble has been detected by the wobble detecting unit 10.

If YES, the processing proceeds to step S26. The control unit 12 produces an output indicative of that the wobble has been detected. The processing is ended.

If NO in step S25, i.e. no wobble has been detected, the processing proceeds to step S27. In step S27, the control unit 12 counts the number of times of rotation of the optical disk 1 on the basis of the rotation information of the optical disk 1 supplied through the I/O 17 to determine whether or not the counted value has reached a prescribed number of times. If NO, the processing reverts to step S25. The processing of steps S25 to S27 is repeated.

If YES, i.e. the counted value has reached the prescribed number of times, the processing proceed to step S28. The processing is ended.

As described above, the actuator 2A is moved toward the inner periphery of the optical disk by superposition of the offset voltage (+V). This is because it is not clear in which state of FIG. 11A and FIG. 11C, the misalignment of the optical axis is when detection of the wobble is started.

When the actuator switch 8 is turned ON and the carriage switch 8A is turned OFF, as described above, as the optical disk 1 rotates, the actuator 2A moves from the inner periphery of the optical disk to the outer periphery thereof.

If the misalignment of the optical axis is in the state of FIG. 11C, the misalignment is corrected as the actuator 2A moves toward the outer periphery so that the present state approaches the state of FIG. 11B.

However, if the misalignment of the optical axis is in the present state of FIG. 11A, the misalignment is further increased as the actuator 2A moves toward the output periphery.

In this case, in step S23, the offset voltage (+V) is generated to move the actuator 2A toward the inner periphery by e.g. 80 μm so that the optical axis is in the state of FIG. 11C. Further, the actuator 2A is moved as the optical disk 1 rotates. Thus, the state of the optical axis approaches the state with no misalignment as shown in FIG. 11B.

Assuming that when the optical disk 1 rotates once, a spiral track thereon moves by 1 μm, in order that the actuator 2A moves by 80 μm×2, the optical disk 1 must be rotated by 160 turns. Therefore, the prescribed number of times of rotation in step S27 is set at 160.

Embodiment 3

Figure 8:
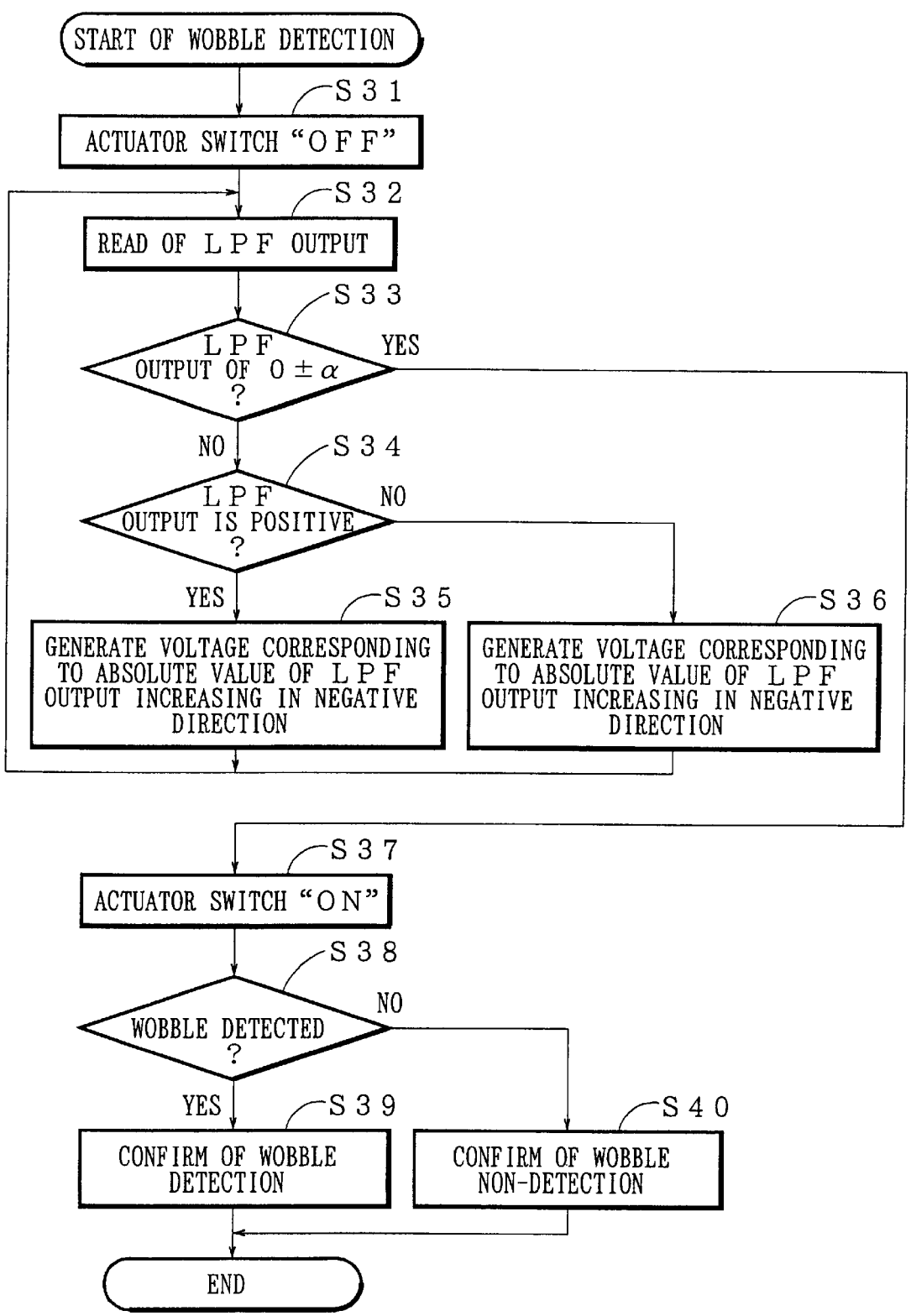
FIG. 8 is a flowchart of the operation of the third embodiment of this invention.

Referring to FIGS. 7 and 8, an explanation will be given of the third embodiment of this invention.

FIG. 7 is an arrangement view of the third embodiment of this invention; and FIG. 8 is a flowchart of the operation of the third embodiment of this invention.

In the arrangement of the third embodiment of this invention, as seen from FIG. 7, a low pass filter (LPF) 18 for passing a DC component and I/O 19 are added to the arrangement of the first embodiment of this invention as shown in FIG. 1.

Referring to FIG. 8, an explanation will be given of the operation of the third embodiment.

In step S31, the control unit 12 turns OFF the actuator switch 8 through the I/O 13.

In step S32, the control unit 12 reads the output value from the LPF 18 through the I/O 19.

In step S33, the control unit 12 determines whether or not the output value from the LPF 18 is 0±α (α is an error providing a negligible influence on the wobble detection). If YES, the processing proceeds to step S37.

In step S34, the control unit 12 determines whether or not the output from the LPF 18 is negative or positive. If positive, in step S35, the control unit 12 instructs the offset voltage generating unit 11 to generate an offset voltage which increases by an amount corresponding to the absolute value of the output value of the LPF 18 in a direction from 0 to negative and add the generated offset voltage to the adder unit 9 through the I/O 14. Further, the processing reverts to step S32. The processing from step S32 to S25 is repeated until the decision of step S33 becomes YES.

If negative in step S34, the processing proceeds to step S36. In step S35, the control unit 12 instructs the offset voltage generating unit 11 to generate an offset voltage which increases by an amount corresponding to the absolute value of the output value of the LPF 18 in a direction from 0 to positve and add the generated offset voltage to the adder unit 9 through the I/O 14. Further, the processing reverts to step S32. The processing from step S32 to S35 and S36 is repeated until the decision of step S33 becomes YES.

In step S33, if YES, i.e., the output from the LPF 18 becomes 0±α, the processing proceeds to step S37. In step S37, the control unit 12 turns ON the actuator switch 8. In step S38, the control unit 12 determines whether or not a wobble has been detected by the wobble detecting unit 10. If YES, the control unit 12 produces an output indicative of that the wobble has been detected. If NO, the control unit 12 produces an output indicative of that no wobble has been detected. Thus, the processing is ended.

As described above, in steps S35 and S36, the offset voltage corresponding to the absolute value of the LPF output value is generated. In this case, the relationship between the LPF output value and the offset value to be added for its correction differs according to the characteristic of an optical system of a product. Therefore, the conversion coefficient from the LPF output value in each product into the offset voltage may be previously set.

In step S33, if the output from the LPF 18 is within a permissible range of 0±α, the processing proceeds to step S37. In step S37, the control unit 12 turns OFF the actuator 8 to detect the wobble. This reason will be explained referring to FIG. 9.

Figure 9A:
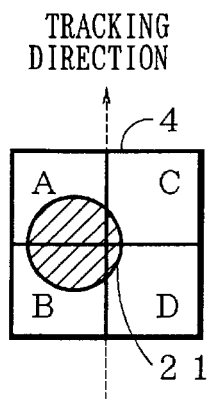
FIGS. 9A–9F are views for explaining the operation of the third embodiment.
Figure 9D:
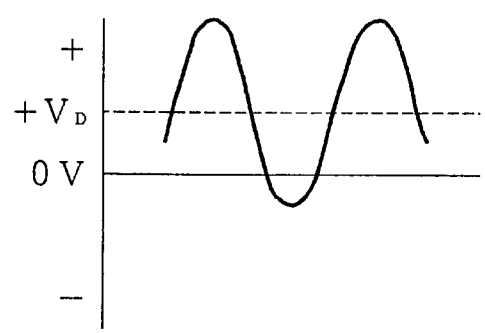
Figure 9B:
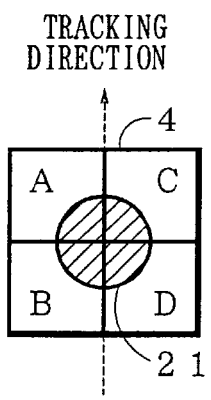
Figure 9E:
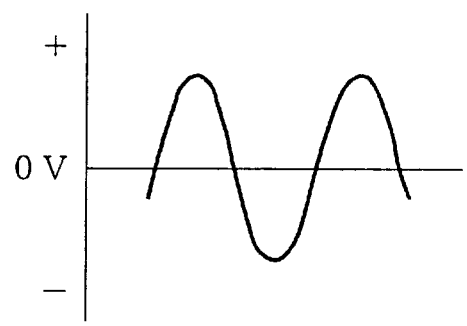
Figure 9C:
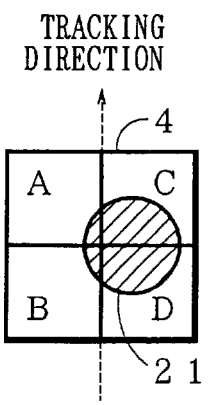
Figure 9F:
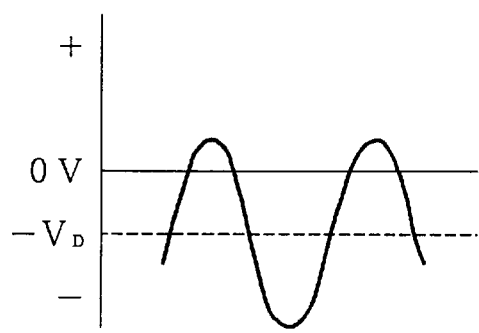
Figure 10:
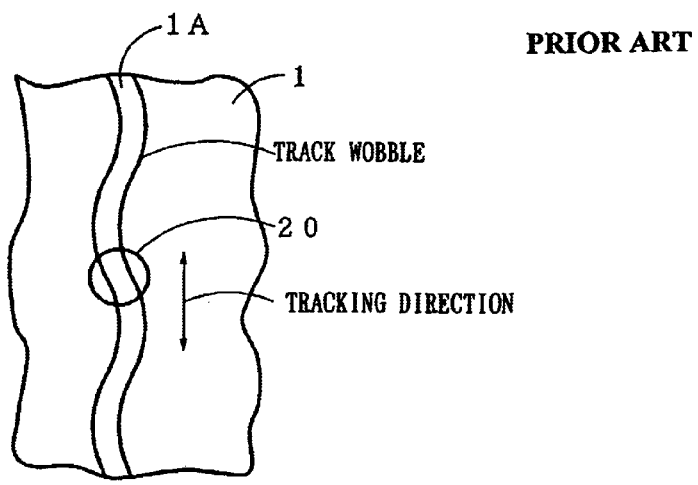
FIG. 10 is a view for explaining the wobble on an optical disk.

FIGS. 9A, 9B and 9C show relative positions of the light receiving element 4 and the light received spot. FIGS. 9D, 9E and 9F shows a waveform of a difference signal A+B−C−D produced from the matrix circuit 5 when the optical disk 1 is rotated once with the actuator switch 8 being in the OFF state.

In the case where there is no misalignment of the optical axis as shown in FIG. 9B, the matrix circuit 5 produces the difference signal A+B−C−D as shown in FIG. 9E, i.e. a sinusoidal difference signal whenever the spot of the laser light projected on the optical disk 1 crosses a track. The DC component thereof is zero.

However, if there is a misalignment of the optical axis as shown in FIGS. 9A and 9B, a positive or negative DC component is superimposed on the sinusoidal difference signal.

Therefore, in the processing of steps S32–S38, the offset voltage is generated from the offset voltage generating unit 11 to move the actuator 2A so that the state of FIG. 9A or 9C is shifted into the state of FIG. 9B with no misalignment of the optical axis, in step S37, the actuator switch 8 is turned ON, and in step S38, the wobble is detected.

In the third embodiment, the polarity and amount of the generated offset voltage can be known from the polarity and absolute value of the output of the LPF 18. Therefore, the offset voltage is generated, and when the output for the LPF 18 is 0±α, the actuator switch 8 is turned ON to detect the wobble. In this way, the wobble can be detected in a short time.

Incidentally, the contents of Japanese Patent Appln. No. 2000-252324 (filed Aug. 28, 2000) are hereby incorporated by reference.

What is claimed is:

1. A wobble detecting apparatus for a device for recording and/or reproducing information for an optical disk, comprising:

a wobble detecting unit for detecting a wobble on the basis of a signal from a light receiving element which receives light reflected from the optical disk;

an offset voltage generating unit for generating an offset voltage;

an adder unit for adding said offset voltage to a control signal to an actuator for the optical disk;

an actuator switch for on/off controlling a control signal to said actuator; and a control unit for turning on said actuator for wobble detection to decide whether or not the wobble has been detected by said wobble detecting unit, and if the wobble has not been detected, causing said offset voltage generating unit to generate a positive or negative prescribed voltage to decide further whether or not the wobble has been detected by said wobble detecting unit.

2. A wobble detecting apparatus according to claim 1, wherein where the wobble has not been detected by the wobble detecting unit when said positive or negative prescribed voltage is generated by said offset voltage generating unit, said control unit causes said offset voltage generating unit to generate a new offset voltage of said prescribed voltage plus the offset voltage previously produced, thereby causing the wobble detecting unit to repeat the wobble detection by a prescribed number of times.

3. A wobble detecting apparatus for a device for recording and/or reproducing information for an optical disk, comprising:

a wobble detecting unit for detecting a wobble on the basis of a signal from a light receiving element which receives light reflected from the optical disk;

an offset voltage generating unit for generating an offset voltage;

an adder unit for adding said offset voltage to a control signal to an actuator for the optical disk;

an actuator switch for on/off controlling a control signal to said actuator;

an carriage switch for on/off controlling a control signal to a carriage on which said actuator is loaded; and a control unit for turning on said carriage switch turning on said actuator for wobble detection and causing said offset voltage generating unit to generate a prescribed voltage to decide whether or not the wobble has been detected by said wobble detecting unit.

4. A wobble detecting apparatus according to claim 3, wherein said control unit counts the number of rotation of the optical disk from when wobble detection is started, and confirms non-detection of the wobble if the wobble has not detected when the counted value reaches a prescribed number of times.

5. A wobble detecting apparatus for a device for recording and/or reproducing information for an optical disk, comprising:

a wobble detecting unit for detecting a wobble on the basis of a signal from a light receiving element which receives light reflected from the optical disk;

a low pass filter for passing a DC component of a difference signal produced from said light emitting element;

an offset voltage generating unit for generating an offset voltage;

an adder unit for adding said offset voltage to a control signal to an actuator for the optical disk;

an actuator switch for on/off controlling a control signal to said actuator; and a control unit for turning off said actuator for wobble detection, causing said offset voltage generating unit to generate the offset voltage so that an output form said low pass filter is zero, turning on said actuator switch when the output from said low pass filter has become approximately zero, and deciding whether or not the wobble has been detected by said wobble detecting unit.

* * * * *

UNITED STATES PATENT AND TRADEMARK OFFICE
CERTIFICATE OF CORRECTION

PATENT NO. : 6,751,172 B2 Page 1 of 1
DATED : June 15, 2004
INVENTOR(S) : Eiji Nakajima It is certified that error appears in the above-identified patent and that said Letters Patent is hereby corrected as shown below:

Column 8,
Line 66, please delete "emitting" and insert -- receiving --.

Signed and Sealed this

Nineteenth Day of October, 2004

JON W. DUDAS
*Director of the United States Patent and Trademark Office*